(12) United States Patent
Simonyi et al.

(10) Patent No.: US 7,949,949 B2
(45) Date of Patent: May 24, 2011

(54) DOMAIN TRANSFORMATION LANGUAGES

(75) Inventors: Charles Simonyi, Medina, WA (US); Shane J. Clifford, Redmond, WA (US)

(73) Assignee: Intentional Software Corporation, Bellevue, WA (US)

( * ) Notice: Subject to any disclaimer, the term of this patent is extended or adjusted under 35 U.S.C. 154(b) by 881 days.

(21) Appl. No.: 11/561,753

(22) Filed: Nov. 20, 2006

(65) Prior Publication Data
US 2008/0120537 A1 May 22, 2008

(51) Int. Cl.
*G06F 17/00* (2006.01)
(52) U.S. Cl. ......... 715/249; 715/200; 715/243; 717/144
(58) Field of Classification Search .................. 715/249, 715/200, 243; 717/144
See application file for complete search history.

(56) References Cited

U.S. PATENT DOCUMENTS

| | | |
|---|---|---|
| 5,339,433 A | 8/1994 | Frid-Nielsen |
| 5,415,275 A | 5/1995 | Girimont |
| 5,493,678 A | 2/1996 | Arcuri et al. |
| 5,546,519 A | 8/1996 | Berry |
| 5,557,730 A | 9/1996 | Frid-Nielsen |
| 5,642,511 A | 6/1997 | Chow et al. |
| 5,748,975 A | 5/1998 | Van De Vanter |
| 5,752,058 A | 5/1998 | Van De Vanter |
| 5,790,863 A | 8/1998 | Simonyi |
| 5,802,334 A | 9/1998 | Nickolas et al. |
| 5,813,019 A | 9/1998 | Van De Vanter |
| 5,850,548 A | 12/1998 | Williams |
| 5,857,212 A | 1/1999 | Van De Vanter |
| 5,911,070 A | 6/1999 | Solton et al. |
| 6,018,627 A | 1/2000 | Iyengar et al. |
| 6,026,233 A | 2/2000 | Shulman et al. |
| 6,038,393 A | 3/2000 | Iyengar et al. |
| 6,078,746 A * | 6/2000 | Simonyi ........................ 717/144 |
| 6,091,893 A | 7/2000 | Fintel et al. |
| 6,115,723 A | 9/2000 | Fallside |
| 6,131,184 A * | 10/2000 | Weeren et al. ................ 717/109 |
| 6,167,328 A * | 12/2000 | Takaoka et al. ............... 700/264 |
| 6,182,274 B1 | 1/2001 | Lau |
| 6,212,672 B1 | 4/2001 | Keller et al. |
| 6,272,672 B1 | 8/2001 | Conway |
| 6,314,559 B1 | 11/2001 | Sollich |
| 6,385,769 B1 | 5/2002 | Lewallen |
| 6,405,364 B1 * | 6/2002 | Bowman-Amuah .......... 717/101 |

(Continued)

FOREIGN PATENT DOCUMENTS
WO WO-2005/043342 5/2005

OTHER PUBLICATIONS

Wilson, G. V."Extensible Programming for the 21st Century" Jan. 2005, ACM, vol. 2, No. 9, pp. 48-57.*

(Continued)

*Primary Examiner* — Adam L Basehoar
*Assistant Examiner* — Michael Scott
(74) *Attorney, Agent, or Firm* — Perkins Coie LLP

(57) ABSTRACT

A method and system for transforming documents from different domains into a common representation for viewing and editing is provided. The system prepares the domain-specific document for visual representation by performing a series of transformations in a pipeline that convert the document from its domain-specific input state to a series of intermediate languages. The intermediate languages share the same syntax regardless of the domain of the document being transformed.

12 Claims, 6 Drawing Sheets

U.S. PATENT DOCUMENTS

| | | | |
|---|---|---|---|
| 6,415,275 B1 | 7/2002 | Zahn | |
| 6,415,299 B1 | 7/2002 | Baisley | |
| 6,421,821 B1 | 7/2002 | Lavallee | |
| 6,453,324 B1 | 9/2002 | Baisley | |
| 6,466,240 B1 | 10/2002 | Maslov | |
| 6,637,022 B1* | 10/2003 | Weeren et al. | 717/109 |
| 6,665,866 B1* | 12/2003 | Kwiatkowski et al. | 717/159 |
| 6,792,595 B1 | 9/2004 | Storistenau et al. | |
| 6,829,745 B2* | 12/2004 | Yassin et al. | 715/236 |
| 6,966,054 B2* | 11/2005 | Simonyi | 717/144 |
| 7,237,226 B2* | 6/2007 | Simonyi | 717/110 |
| 2001/0037496 A1* | 11/2001 | Simonyi | 717/7 |
| 2002/0007483 A1 | 1/2002 | Lopez | |
| 2002/0010713 A1 | 1/2002 | Egilsson | |
| 2003/0153998 A1* | 8/2003 | Clifford | 700/121 |
| 2004/0225964 A1* | 11/2004 | Simonyi | 715/530 |
| 2005/0010906 A1* | 1/2005 | Simonyi | 717/123 |
| 2005/0097453 A1* | 5/2005 | Simonyi | 715/513 |

OTHER PUBLICATIONS

W3C, "HTML Specification" http://web.archive.org/web/20050518004824/http://www.w3.org/TR/REC-html40/cover.html, archive from May 18, 2005.*

W3C, "HTML Specification" http://web.archive.org/web/20050518010053/www.w3.org/TR/REC-html40/interact/forms.html, archive from May 18, 2005.*

W3C, "HTML Specification" http://web.archive.org/web/20050518075851/www.w3.org/TR/REC-html40/present/frames.html, archive from May 18, 2005.*

W3C, "HTML Specification" http://web.archive.org/web/20050519010843/www.w3.org/TR/REC-html40/struct/text.html, archive from May 18, 2005.*

W3C, "SVG Specification" http://web.archive.org/web/20041204062438/www.w3.org/TR/SVG11/, archive from May 18, 2005.*

W3C, "SVG Specification" http://web.archive.org/web/20041204080629/www.w3.org/TR/SVG11/coords.html, archive from May 18, 2005.*

W3C, "SVG Specification" http://web.archive.org/web/20041204110602/www.w3.org/TR/SVG11/masking.html, archive from May 18, 2005.*

Eric T. Ray, "Learning XML", 2002, O'Reilly Media, Inc., pp. 1-9 (as printed).*

Decouchant, Domnique, and Manual Romero Salcedo. "Alliance: A Structured Cooperative Editor on the Web". In: Proceedings of the ERCIM workshop on CSCW and the Web. Sankt Augustin, Germany, Feb. 1996, 6 pp.

Boshernitsan, Marat, Michael Downes. "Visual Programming Languages: A Survey." Berkeley, CA: University of California, Berkeley Computer Sciences Division; 2004. Technical Report No. UCB/CSD-04-1368, 28pp.

Hoeven, Joris Van der. "GNU TeXmacs: A Free, Structured, wysiwyg and Technical Text Editor." Paris: Cahiers GUTenberg, May 2001, pp. 39-50.

Ingalls, Dan and Scott Wallace, Yu-Ying Chow, Frank Ludolph, Ken Doyle. "Fabrik A Visual Programming Environment." OOPSLA '88 Conference Proceedings. http://users.ipa.net/~dwighth/smalltalk/Fabrik/Fabrik.html, 18 pp.

Squeak. Home Page. www.squeak.org, accessed Nov. 21, 2005, 3pp.

Habermann, A. Nico, David Notkin. "Gandalf" http://www.cs.washington.edu/homes/notkin/talks/icse97-case/sId027.htm, accessed Nov. 21, 2005, 1p.

Khoral. "Cantata Visual Programming Environment Description." http://web.archive.org/web/20040411231419/http://khoral.com/khoros/cantata/desc.php, accessed Dec. 21, 2005, 2pp.

Massachusetts Institute of Technology. "LAPIS Editing Text with Lightweight Structure." http://groups.csail.mit.edu/graphics/lapis, accessed Nov. 21, 2005, 3pp.

Plotkin, David. "Alice—The Personal Pascal." *Antic*, vol. 6, No. 2, Jun. 3, 1987, http://www.atarimagazines.com/v6n2/Alice.html, 6pp.

Rational. "Rational XDE Professional: Liberated Development." http://web.archive.org/web/20020602015920/www.rational.com/products/xde/, accessed Nov. 21, 2005, 4 pp.

Najork, Marc. "Cube: a 3D Visual Programming Language." http://web.archive.org/web/20021211163908/http://research.compaq.com/SRC/personal/najork/cube.html, accessed Nov. 21, 2005, 3pp.

Engström, Henrik. "Jackson Structured Programming Editor." http://web.archive.org/web/20030625214820/www.ida.his.se/~henrike/JSP/example.chtml, accessed Nov. 21, 2005, 2pp.

Eclipse. Home page. http://eclipse.org/main.html, accessed Nov. 21, 2005, 3pp.

IBM. "IBM VisualAge for Java, Professional and Enterprise Editions Version 4.0, Assists Developers in the Creation of Java-based e-business Applications." Software Announcement, Jun. 26, 2001. http://vvww-306.ibm.com/fcgi-bin/common/ssi/ssialias?infotype=an&subtype=ca&appname=Demonstration&htmlfid=897/ENUS201-182, accessed Dec. 2, 2005, 15 pp.

Fernández-Conde et al., "Domain Analysis of Object-Oriented Frameworks in Framedoc," 2002 by SEKE Ischia, Italy, pp. 27-33.

Grundy et al., "Generating Domain-Specific Visual Language Editors from High-level Tool Specifications," 21st IEEE International Conference on Automated Software Engineering (ASE '06), 10 pgs.

Simonyi et al., "Intentional Software," Proceedings of the Conference on Object-Oriented Programming Systems, languages, and Applications, (OOPSLA '06), and Proceedings of the 21st Annual ACM SIGPLAN Conference on Object-Oriented Programming Sys., Oct. 25, 2006, Portland, OR, USA, pp. 451-463.

* cited by examiner

DOMAIN TRANSFORMATION LANGUAGES

BACKGROUND

Various types of documents can be created for different purposes to represent different domains. For example, word processing is one domain that has documents created in a natural language such as English and generally contains concepts such as paragraphs, summaries, and headings. Word processing documents can have several types, such as memos, outlines, and letters. Another domain is computer programming that uses elements of a programming language such as identifiers, flow control, and arithmetic operators to represent a computer program. Computer programming documents can also have several types, such as header files, implementation files, and resource files. Each domain has its own set of constraints that defines the proper syntax and lexicon for creating understandable documents in that domain. Even though domains and documents vary greatly, the ways of representing these documents for viewing and editing share many similarities.

Currently, different applications are used for viewing and editing documents for each document domain, and sometimes for each type of document within a domain. For example, many commercial word processors exist for viewing and editing word processing documents. Likewise, many programming editors exist for viewing and editing computer programs, often with separate editors for each programming language. The separation of viewing and editing applications by domain creates a burden on the user of each application to know which application to use for viewing and editing a particular document and to learn the unique features associated with each application. The separation of viewing and editing applications also creates a burden on application developers, who often must reimplement and separately maintain new source code similar to source code that already exists for another domain. The additional burden on application developers introduces additional programming errors, or bugs, and the effort required delays the availability of fully featured applications for viewing and editing documents of new domains.

DETAILED DESCRIPTION

Figure 1:
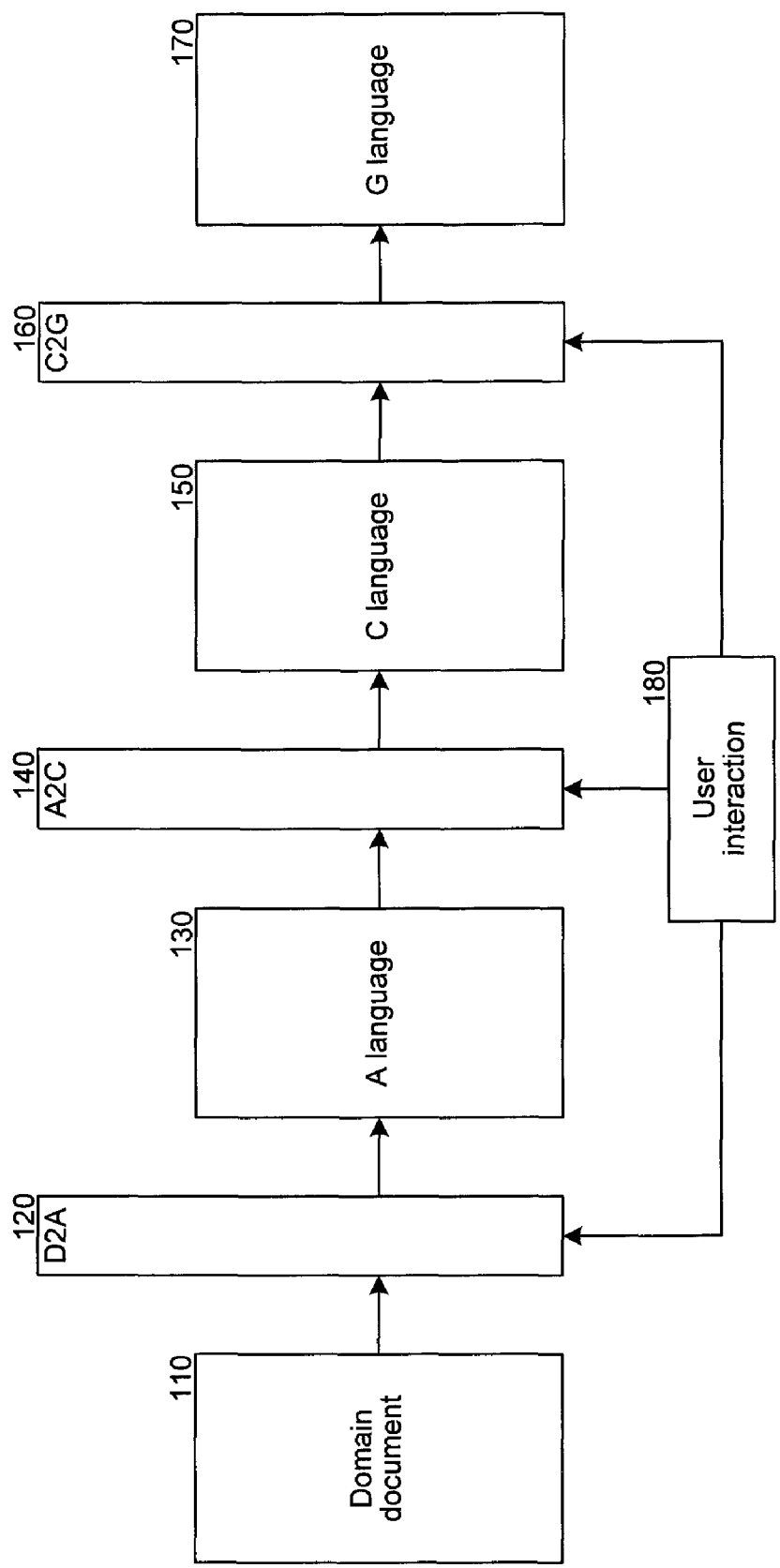
FIG. 1 illustrates the transformation pipeline in one embodiment.

A method and system for transforming documents from different domains into a common representation for viewing and editing is provided. For example, the transformation system can be used to view and edit word processing documents, source code documents in various programming languages, documents containing mathematical formulas, and so on. The system prepares a domain-specific document for rendering (e.g., to a computer screen or printer) by performing a series of transformations in a pipeline that convert the document from its domain-specific input state to a series of intermediate languages for representing different aspects of the document. Breaking down the transformation process into several smaller steps allows the system to reuse a substantial amount of source code for displaying and editing documents from many different domains. The intermediate languages have the same syntax regardless of the domain of the document being transformed. Three such intermediate languages are: an abstract language (A), a concrete language (C), and a graphical language (G). The abstract language represents the document in a common syntax and removes the need for domain-defined concepts to interpret the document in later stages of the transformation pipeline. The abstract language is a unique language that allows the later stages of the pipeline to be the same for many different types of documents. The concrete language resolves notational choices such as how fractions, trees, or other items are displayed, and represents the document in a form that is suitable for displaying the document in display areas of varying dimensions and in conjunction with features such as scrolling. The graphical language describes the rendering of the visible elements of the document on a particular display area. The combination of the A, C, and G languages forms a unique pipeline that allows viewing and editing documents from many domains. These languages are described in further detail below.

Documents may be edited at each step of the transformation. A system for transforming various types of documents from a domain-specific representation through various stages for viewing and editing was described in U.S. Patent Application No. 2005/0097453, entitled "METHOD AND SYSTEM FOR REVERSIBLE DESIGN TREE TRANSFORMATIONS," which is hereby incorporated herein by reference. For example, a user may directly manipulate the visible elements on the screen in a way that changes the graphical language representation. These changes may be applied to earlier language representations in the pipeline through reverse transformations until they are represented in the domain language. Changes made at a stage in the transformation pipeline before the graphical language representation may be forward projected in the pipeline to be rendered on the display device. Editing may also occur at the domain language level, such as through a tool outside the transformation environment that is unique to the domain or through an advanced editing facility within the transformation environment. Changes made outside the domain language level may be incompatible with the domain. For example, during editing of a C++ program the incomplete text may not compile until the user is finished completing a change. A system for storing pending changes to a domain was described in U.S. Patent Application No. 2004/0225964, entitled "METHOD AND SYSTEM FOR STORING PENDING CHANGES TO DATA," which is hereby incorporated herein by reference.

The steps performed to transform various types of documents in this way often share many common elements. For example, although a paragraph in a word processing document and an "if" statement in the C++ programming language have very different purposes and meanings, both are often represented in a rectangle that is laid out on the page above or below other similar rectangles representing other paragraphs or program blocks. Similarly, editing both types of documents may be performed by modifying text within a graphical rectangle or rearranging the order of graphical rectangles on the screen. For example, a new word may be added to a paragraph in a word processing document, or a new statement may be added to a program block. Likewise, a paragraph may be moved within a word processing document, and program blocks may be moved within a program. The A, C, and G languages describe documents in various ways that take advantage of the common elements shared by documents of many different domains. In this way, the system allows a viewing and editing facility to be shared among many different types of documents and reduces the amount of custom software that needs to be written to support additional types of documents.

The A Language

The first language is the abstract language, called the A language, which is a notation language for expressing a variety of domains in a common syntax. A document starts out in a domain language, and the domain is responsible for transforming the document into the A language using a transformation called the domain-to-abstract (D2A) transformation. Example domains are word processing, C++, SQL, C#, calendars, a dialog box, and so on. The A language seeks to minimize domain-specific notation and convert the domain representation into a common syntax. For example, while the English language can have a complex variety of word combinations used to make sentences and paragraphs, an abstract language can represent any English document by containing elements for representing the 26 letters of the alphabet, and other characters such as spaces, punctuation, and line feeds. The abstract domain is the form where the desired notation is expressed in a fixed set of notational terms that have general domain-independent traditions that include multiple interchangeable, equivalent notations. These include the more specific ideas of "addition," "division," and "syntax equation," as well as the more general ideas of "text," "tables," "vertical lists," "hierarchy," "operator precedence," and so on.

Elements of the A language are divided into several groups: data, statements, operations, and organizers. The first group, data, represents data that is text, numeric, graphical, or other generic data that does not contain semantics that need to be preserved for proper visual representation. The second group, statements, is used to preserve common intentions of document authors that are needed to express the document in a variety of different notations. For example, elements are defined in the A language to represent common programming constructs such as switch statements, loops, transfers, and comments. The third group, operations, is used to represent document elements that have combinational semantics defined by priority such as items in parentheses in a programming language or formula typesetting in a mathematical document. For example, elements are defined for representing basic arithmetic, binary operations, and variable assignments. The fourth group, organizers, represents items that are not necessarily expressed in the domain but are useful for storing organizational information that affects the visual representation of the document. For example, blocks of code, lists of items, blocks of text, and other similar groups can be represented using the organizer elements of the A language. These elements can be used during editing to identify related regions of the document that a user may intend to edit. For example, organizers preserve the ability of a user to select a paragraph to edit or a block of code to remove. Some domain notational concepts are not common enough to have analogous elements in the A language, but can be nevertheless be expressed in the A language using more general elements such as AChain, AKeyword, and AOBlock (described below) to represent the keywords, blocks and relationships between the elements. For example, the C# language try/catch notation could be implemented using general A language elements, but if many languages added a similar concept then the A language may also be modified to include specific elements to represent this notation.

Although the transformation of a document into the A language places it in a common representation, there are still many choices that affect the ultimate graphical expression of the document. For example, although the A language may identify data representing a time, that time may be graphically represented as analog or digital. Text may be identified as highlighted, but the manner of highlighting may vary from a yellow background to bold text to blinking text. A digital circuit could be shown using graphical gates or programming operators. A programming language may have many legitimate representations for a particular program, but the user may have set preferences indicating whether they prefer one operator per line, spaces after commas, and so on.

Table 1 shows several elements of the A language:

TABLE 1

| Element | Description |
| --- | --- |
| AAssign | an assignment statement that assigns a value from one atom to another |
| AAtom | a value, such as a variable in a programming language |
| ABinOp | a binary operator having two operands |
| ACaret | a caret, such as a cursor |
| AChain | a list of related items |
| AElseIf | a conditional "else if" statement |
| AEq | a test for equality |
| AFormula | a computed value |
| AHoriz | a horizontal list |
| AIf | a conditional "if" statement |
| AKeyword | a keyword that has a defined meaning in the domain |
| ALink | a sequence of two items in a chain of items |
| ALiteral | a literal value, such as a string or constant |
| ANaryOp | an n-ary operator having n operands |
| ANull | a null value |
| ANumeric | a numeric value; may also carry dimension (such as time and length), units, scale, etc. |
| AOBlock | a block of statements grouped together |
| AOp | an operator that cannot be more specifically defined by other elements of the A language |
| AOParen | a block of elements enclosed in parentheses |
| AOpList | a list of operators |
| AOSpace | a location where a space is located between two elements |
| AOSpaceOpt | a location where a space can optionally be located between two elements |
| AOther | an item that cannot be more specifically defined by other elements of the A language |
| APlus | an addition operator |
| ARef1 | a reference to another value |
| AReturn | a return from a function |
| ASeq | a sequence of items such as a horizontal list |
| AText | a text value |
| AVarDecl | a declaration of a variable |
| AVert | a vertical list |

The C Language

The concrete language, called the C language, represents the document after a specific set of symbols, text, glyphs, and graphics (collectively described as marks) has been chosen for representing the document, but before the chosen marks have been laid out on the display. The A language representation is transformed to the C language representation by resolving any notational choices, such as how programming blocks are going to be formatted (e.g., curly braces on lines by themselves, spaces after parentheses, and so on). The C language expresses content and relationships, but not specific positions of items in the representation. For example, the C language may indicate that particular text is highlighted using green text and italics. The C language also contains anchor points that are used to identify areas within the document that a user can select to perform editing tasks. The C language describes the layout of a document in an invariant way that can respond to the interplay between the sizes of elements and the space allotted for them on the display device. For example, the C language contains sufficient information to render a paragraph of text if given the size of the window that the text should be rendered in. In this example, the C language identifies areas in the paragraph where line breaks could occur, which may or may not actually end up being line breaks in the visual representation based on the size of the area the paragraph is rendered in. The C language may incorporate formatting choices specified by the user that are not represented at other stages of the transformation pipeline.

A variant of the C language is the pending language, which allows for representing intermediate changes produced by editing the document. Documents may go through states during editing that are invalid for the particular domain. For example, in the word processing domain, a sentence will not always be correct English while the user is in the process of typing it for the first time. As another example, a C++ program may contain incorrect statements while the user is typing a new line of source code. The pending language provides a notation for representing changes that are in progress. The pending language may also allow the superposition of text over a selected area for editing. For example, in a C++ document a user could select a "while" statement and replace it with an "if" statement. Additional methods of storing pending changes are described in the application entitled "METHOD AND SYSTEM FOR STORING PENDING CHANGES TO DATA," referenced above.

The elements of the C language are grouped into the following categories: frames, controls, organizers, and marks. Frames represent a box with layout rules. Frames can be nested such that one frame contains many other frames, which contain frames, and so on. A frame may be visible or not based on user commands, and may change type and layout based on user interaction such as selection of the frame. Following are a few examples of frame types. The first type of frame is a LineItem, which represents a box for containing text. A LineItem frame is responsible for processing text according to the wrapping and line break rules applicable to the text in the frame. A LineItem may also include a defined amount of space to appear before and after text in the frame, either vertically or horizontally. A LineItem can be used to represent a statement of a program, a long comment, or a paragraph in word processing.

Another type of frame is a GraphicsItem, which represents a grouping of graphical marks with layout information. Another type of frame is a Vertical frame. A Vertical frame represents a column of frame rectangles arranged vertically. A Vertical frame may contain nested LineItem frames representing paragraphs, such that the combination of frames represents a typical word processing document in which many paragraphs are arranged vertically down the page. A similar type of frame, Horizontal, arranges a row of frame rectangles, and can be used to represent a time line, horizontal list, or other horizontal data. A Desktop is a type of frame that arranges rectangles in rows and columns, similar to a desktop in a typical operating system shell. A Tree is a type of frame that arranges rectangles hierarchically. Finally, a Transparent frame is an invisible frame that stores some structural information that would otherwise be lost when transforming a document into displayable form. For example, a procedure in a programming language might be individually selectable, but might be initially grouped with other procedures in a single frame for display. By maintaining a Transparent frame around the procedure, the user is able to individually select the procedure.

The second category of C language elements contains controls. Controls are items that change the state of the display or the document. For example, one type of control is BreakOption, which sets the current position as a break opportunity in text. Another type of control is SetContString, which specifies a continuation string to be placed at every line continuation where a break occurs. For example, in C++ it is common to begin each line within a comment with the same character, such as an asterisk. Another type of control is SkipRight, which is used in column-based frames to indicate that the current column is empty and should be skipped. Another type of control is SetTab, which sets the tabification rules for a block of text.

The third category of C language elements contains organizers. Organizers are groups or hierarchies of controls whose purpose is to define the scope of the state change specified by the controls. For example, an organizer can indicate that a particular line break strategy is to be applied to an entire paragraph. An organizer may also indicate that a particular area has been highlighted by the user, or that default break rules defined for a document should not apply to a particular area.

The final category of C language elements contains marks. A mark is a primitive leaf node in the document representation such as text or an image. Example marks are text, carets, icons, canvases (e.g., a desktop or other 2-D space), scalable symbols, and graphical marks (e.g., lines, circles, etc.). A caret is used to indicate information before or after other marks. A scalable symbol is a symbol whose representation changes based on the layout of the region in which it is displayed. For example, one scalable symbol could be a square root sign, and the visual representation of it may differ based on whether it is applied to a fraction and how the fraction is laid out on the display device. In some embodiments, marks carry layout information. For example, text may specify that it is horizontally flexible (e.g., it can be wrapped on several lines or compressed horizontally as in justified text), but not vertically flexible.

Layout is the process of preparing items represented in the C language for display on a display device by transformation to the G language. Layout of C language items varies based on the type of frame being displayed. For example, for a LineItem a z-layout algorithm is applied in which text is mapped into an array of lines that accounts for leading space, trailing space, and line breaks in a z-shaped pattern (left to right then down a line and repeat). For Tree frames, layout is performed level by level and may be impacted by user intervention at any level. For example, Tree frames may be laid out in a variety of representations such as balanced, one-sided, growing to the right, growing down, and may have different styles of connecting lines such as straight, squared, or zigzag. These types of layout options may be specified by the domain using properties that are passed through the pipeline via the A language or by user preference. Desktop frames may be laid out using a row/column grid, a z-shaped pattern, or in a spiral pattern depending on the layout options specified.

The C language is also used to represent formats and styles. Formatting options are those that apply to individual marks such as bold type or a font selection. Styles are groupings of formatting options, such as a heading style, which may specify that a heading should be bold, underlined, and in a larger font than normal text.

Table 2 shows several elements of the C language:

TABLE 2

| Element | Description |
| --- | --- |
| CCBreak | a break control |
| CCBreakIfAnyBreaks | a control that sets the current position as a required break if any breaks occur |
| CCBreakOption | a control that sets the current position as a break opportunity at the given priority |
| CCEnsureSpace | a control that enforces a minimum amount of space |
| CCGoToTab | a control that sets the indentation for a particular item or items by inserting white space up to a specified position |
| CControl | a generic control |
| CCSetContString | a control that specifies the continuation string to use when text is wrapped across lines |
| CCSetTab | a control that sets the default indentation |
| CCSpace | a control that inserts white space |
| CEmptyCell | an item that represents an empty cell |
| CFAbsolute | a frame that arranges items in an absolute location |
| CFBracket | a more specific form of CFDesktop that arranges items in levels within brackets, possibly having different indentation rules at each level |
| CFCanvas | a frame that represents a rectangular area |
| CFDesktop | a frame that arranges items in a two-dimensional layout |
| CFEmptyLineItem | a placeholder where a CFLineItem can be inserted |
| CFHorizontal | a frame that arranges items horizontally |
| CFLine | a frame that arranges items in a line |
| CFLineItem | a frame that encapsulates an item in a line |
| CFrame | a generic frame |
| CFStack | a more specific form of CFDesktop that arranges items one on top of the other |
| CFTable | a frame that arranges items in tabular format |
| CFTableRow | a frame that arranges a row within a table |
| CFTransparent | a frame that is not visible but stores layout information that may later be useful for selection or editing |
| CFTree | a frame that arranges items hierarchically in a tree |
| CFVertical | a frame that arranges items vertically |
| CMItem | a generic item |
| CMBitmap | an item that represents a bitmap image |
| CMCanvas | a mark that represents a rectangular item |
| CMCaret | an item that represents a cursor |
| CMFlexmark | a flexible mark for representing a variety of items |
| CMHLine | an item that represents a horizontal separator line |
| CMLitString | an optimized version of CMLitText that carries the string in its payload rather than separately |
| CMLitText | similar to CMText but cannot be broken across lines |
| CMTbd | represents a missing operand that is stored in the domain |
| CMText | an item that represents text |
| COAreaHighlight | an organizer that represents a highlighted area |
| COLevel | a level organizer |
| CORailWay | an organizer that arranges items in a line like a railroad track |
| COrganizer | a generic organizer |
| COTransparent | a transparent organizer |
| CSpa | a point in space |

The G Language

The graphics language, called the G language, represents the final stage of the document before display. The transformation to the G language maps the actual dimensions and characteristics of the display area to the C language representation to display the document. The graphical language is used to describe the actual layout of elements of the document, meaning that their sizes, clippings, and positions (including the order for overlapping marks) have been determined. The G language is made up of canvases and marks. A canvas is an area of the display with specific dimensions. For example, a canvas could be a list box, scrollable window, or a list of programming statements. There may be many canvases that make up the complete display, both adjacent to one another and in layers. Canvases may also be hidden, such as when a region of text is scrolled outside the viewable area in a scrollable window. A mark in the G language represents a part of the displayed image. A mark contains a reference position relative to the canvas and rectangles representing the content, layout, and pointing area for receiving user selections. A mark can represent text, cursors, lines, a blank area, rectangles, or other shapes or data.

Hit testing is the process of mapping points selected by the user to G language marks. When a user selects an object or an area, the affected marks are identified by hit testing and the selection information is passed through the transformation pipeline to be handled at the appropriate level.

Table 3 shows several elements of the G language:

TABLE 3

| Element | Description |
| --- | --- |
| GAfterMark | a mark that specifies a location after an item |
| GArc | a mark that represents an arc |
| GArrow | a mark that represents an arrow |
| GArrowhead | a mark that represents an arrowhead |
| GBeforeMark | a mark that specifies a location before an item |
| GBeginMark | a mark that represents the beginning of a group |

TABLE 3-continued

| Element | Description |
| --- | --- |
| GBoxTitle | a mark that represents a title |
| GCanvas | a rectangular shape that supports the creation of an image scrolled, scaled, and cropped by a rectangle |
| GCaretCursor | a mark that represents a cursor |
| GEndMark | a mark that represents the end of a group |
| GFence | a mark that defines a boundary between items |
| GFillImage | a mark that represents an image that is repeated throughout a frame |
| GFrame | a generic frame for laying out marks |
| GHarness | a mark that ties items together |
| GIcon | a mark that represents an icon |
| GImage | a mark that represents an image |
| GMark | a generic mark that represents a visible item in the layout |
| GRect | a mark that represents a rectangle |
| GSpa | a mark that represents a point in space |
| GText | a mark that represents text |
| GVerticalFrame | a special frame that contains marks arranged vertically |

Figures

FIG. 1 illustrates the transformation pipeline in one embodiment. The transformation system receives an input document 110 in a domain-specific language. The input document 110 passes through a domain-to-abstract transform 120 that produces an abstract language document 130. The abstract language document 130 passes through an abstract-to-concrete transform 140 that produces a concrete language document 150. The concrete language document 150 passes through a concrete-to-graphical transform 160 that produces a graphical language document 170. The graphical language document 170 is then used to display the document to a user for viewing and editing. At any stage of the pipeline, user input 180 may influence the transformation and cause different output to be produced based on formatting preferences, coding style, or other factors received from the user. Although three transforms are shown, other intermediate transforms may also be part of the transformation pipeline, such as a pending transform for representing pending changes that are not yet part of the domain document or a selection transform for representing user selections of portions of the document. A document may also undergo multiple transforms at the same level. For example, a document may pass through a domain-to-domain transform to reduce domain concepts to a more appropriate representation for the domain-to-abstract transform 120.

Figure 2:
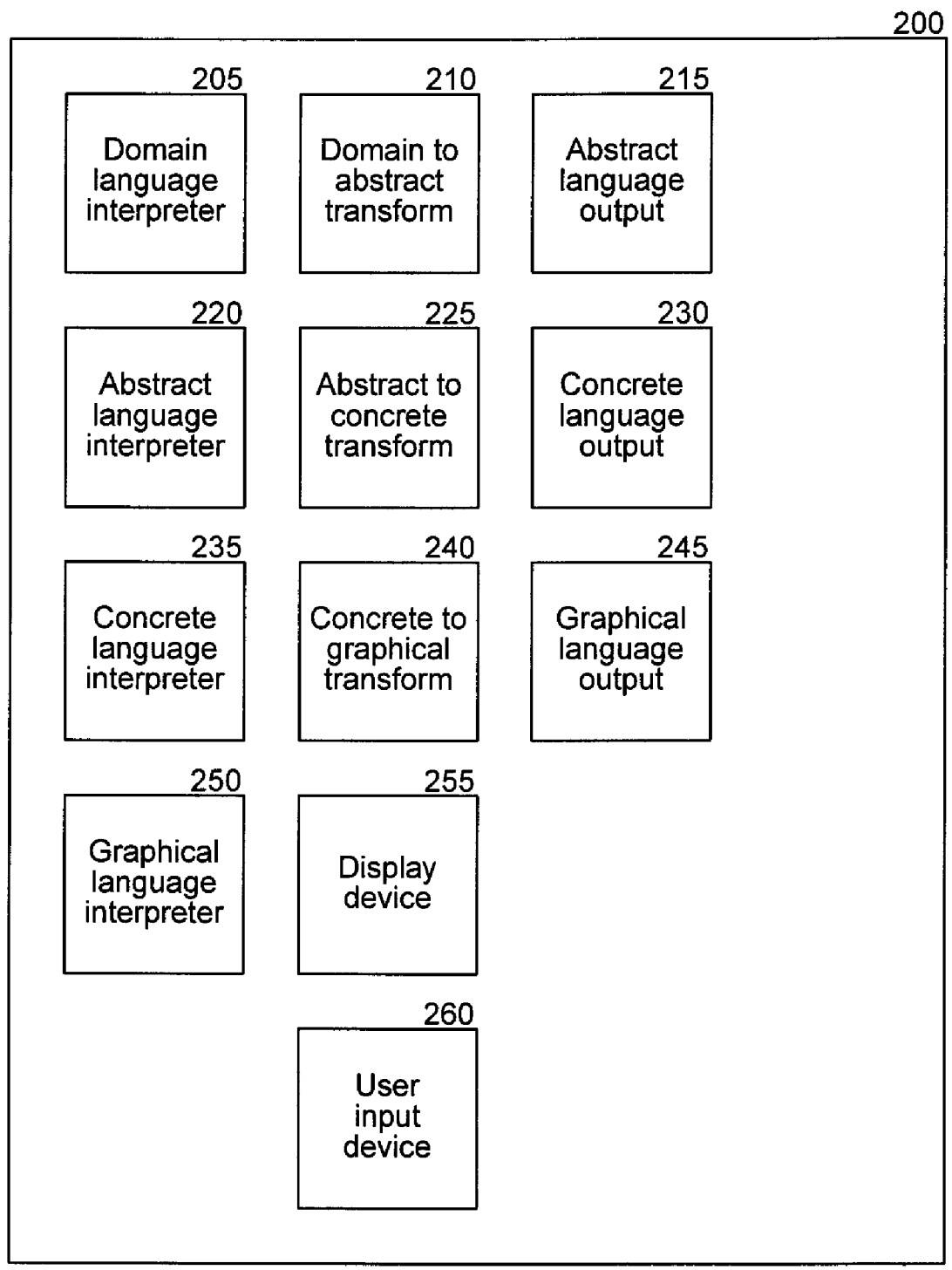
FIG. 2 is a block diagram that illustrates components of the transformation system in one embodiment.

FIG. 2 is a block diagram that illustrates components of the transformation system in one embodiment. The transformation system 200 includes a domain language interpreter component 205, a domain-to-abstract transform component 210, an abstract language output component 215, an abstract language interpreter component 220, an abstract-to-concrete transform component 225, a concrete language output component 230, a concrete language interpreter 235, a concrete-to-graphical transform component 240, a graphical language output component 245, a graphical language interpreter 250, a display device 255, and a user input device 260. The domain language interpreter component 205 receives a domain language document and interprets the domain-based concepts that it contains. The domain-to-abstract transform component 210 transforms the domain language document into the abstract language by converting domain-based concepts into an abstract representation. The abstract language output component 215 outputs the abstract language document from the transformed domain document. When supporting new domains, typically only the domain language interpreter component 205, domain-to-abstract transform component 210, and abstract language output component 215 need to be modified. The abstract language is designed to provide an abstract representation for a variety of domains such that the remainder of the system can be reused for each domain. The abstract language interpreter component 220 interprets the abstract language document produced by the abstract language output component 215, and passes the interpreted document to the abstract-to-concrete transform component 225. The abstract to concrete transform component 225 transforms the document from the abstract representation to a concrete language representation that resolves notational choices. The concrete language output component 230 outputs the concrete language document from the transformed abstract document. The concrete language interpreter 235 interprets the concrete language document and passes the interpreted document to the concrete to graphical transform component 240. The concrete-to-graphical transform component 240 converts the document from the concrete language representation to a graphical language representation. The graphical language output component 245 outputs the transformed graphical language document. The graphical language interpreter 250 interprets the graphical language document and prepares the document for display on the display device 255. The display device 255 may be a computer screen, a monitor, or other display device that displays the document for viewing by a user. The user input device 260 receives input from the user for editing, scrolling, or other interaction with the document and informs the system of user requests so that the document can be updated and redisplayed. The user input device 260 may be a mouse, keyboard, touch screen, or other device that responds to input from a user.

The computing device on which the system is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, digital cameras, network PCs, mini-computers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
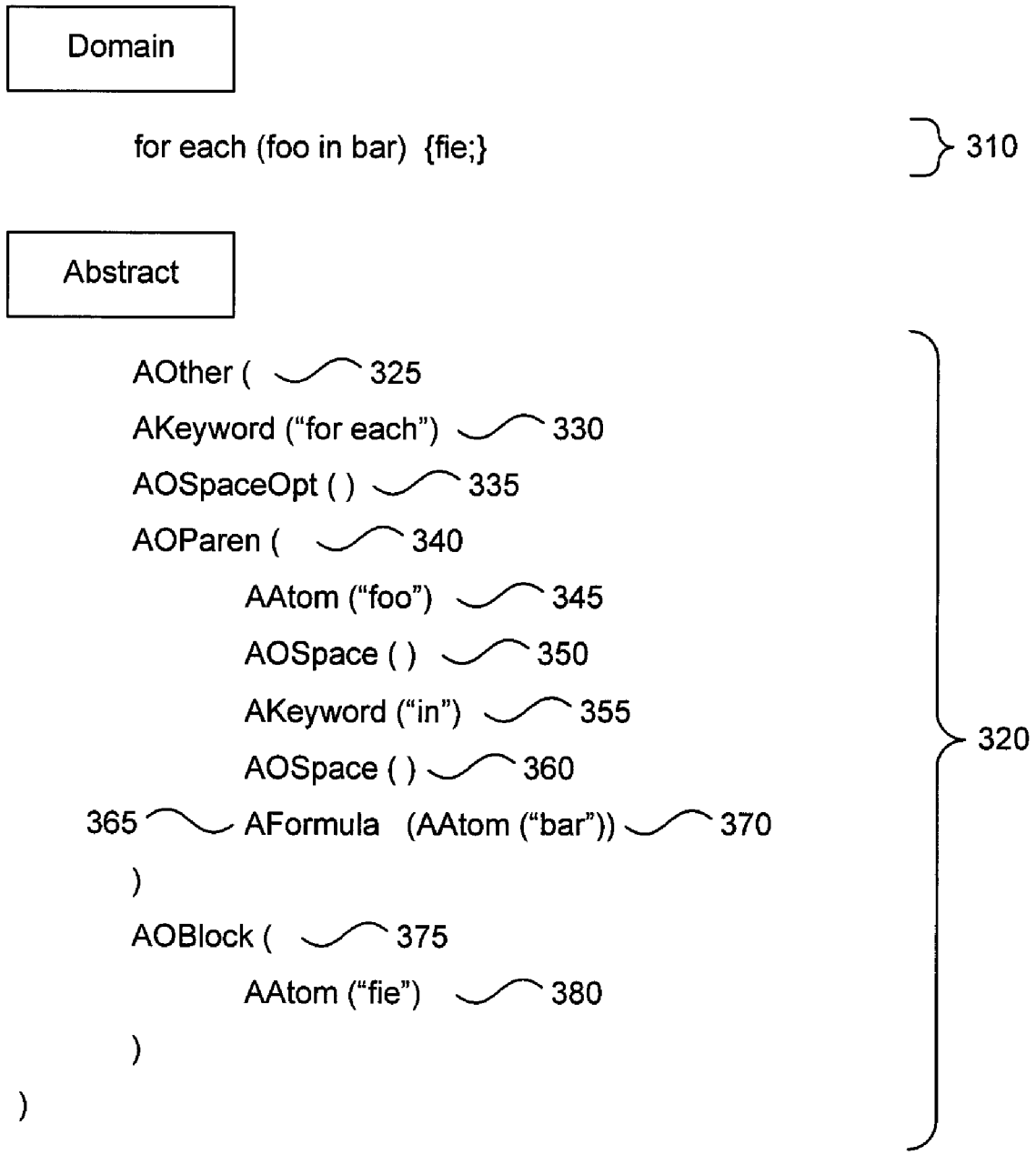
FIG. 3 illustrates an abstract language representation of a portion of a computer program in one embodiment.

FIG. 3 illustrates an abstract language representation of a portion of a computer program in one embodiment. A statement 310 is shown in a programming language such as C# that includes certain keywords defined by the language (e.g., "foreach") as well as certain variable names defined by the user (e.g., "bar"). Following the domain-to-abstract transform, an abstract language representation 320 is produced. The abstract language representation shown in the figure contains elements of the A language for representing domain language keywords (e.g., AKeyword), punctuation that organizes a block (e.g., AOSpaceOpt, AOSpace, and AOBlock), and common domain concepts (e.g., AFormula and AAtom). The AOther element 325 represents the organizational structure of the domain language document that is retained, which in this example represents that everything that follows is grouped together in a block. The AKeyword element 330 represents the "foreach" domain keyword. The AOSpaceOpt element 335 represents a location to optionally place a space based on user preferences or other factors such as document style settings. The AOParen element 340 represents the organizational construct of parentheses found in the domain that groups the enclosed statements together. The AAtom element 345 represents the atom "foo" that represents a user-defined variable in the domain. The AOSpace elements 350 and 360 represent spaces in the domain that should be retained in the displayed representation. The AKeyword element 355 represents the domain language keyword "in." The AFormula element 365 indicates that the enclosed statements are part of a formula. The formula contains an AAtom element 370 that represents an atom "bar" defined in the domain document. The AOBlock element 375 defines a block of statements that should be grouped together. The AAtom element 380 is the only statement inside the block and represents an atom "fie" in the domain document. Although some domain concepts are lost during conversion to the abstract language (e.g., what the behavior of the foreach statement is in the domain), the abstract language represents all of the structure and concepts from the domain language that are necessary to represent the document visually and allow the user to interact with the document.

Figure 4:
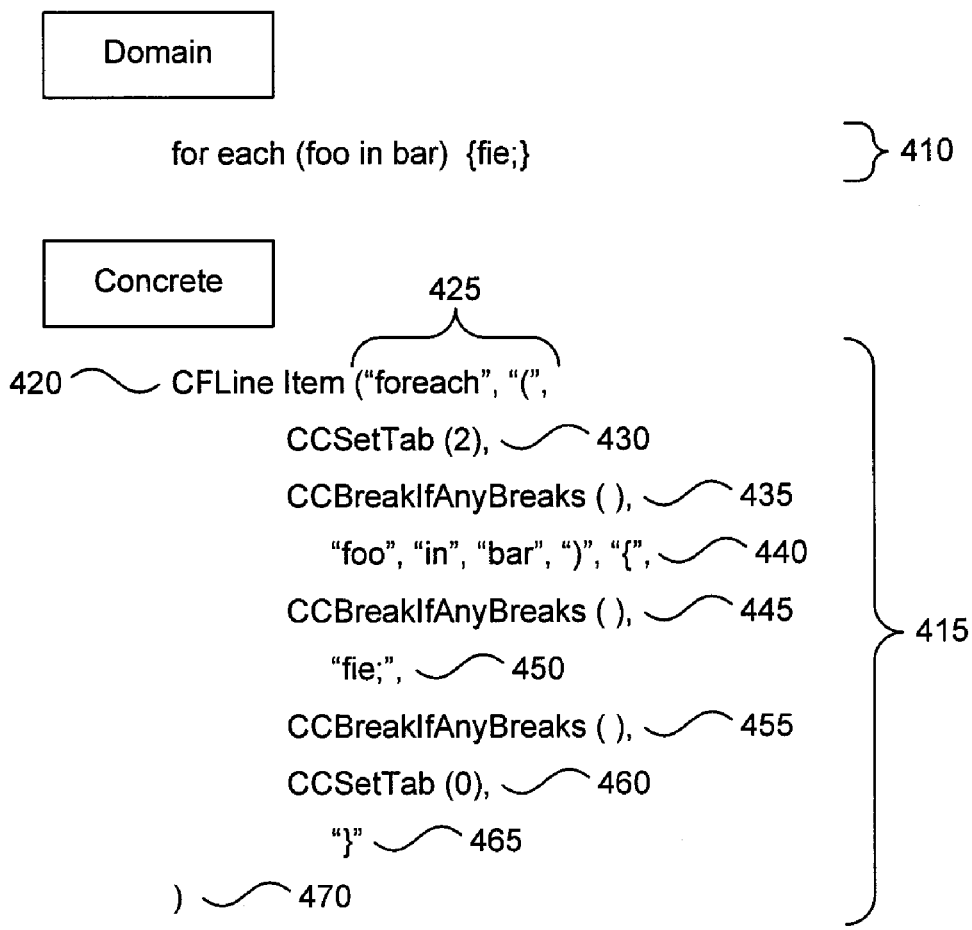
FIG. 4 illustrates a concrete language representation of a portion of a computer program in one embodiment.

FIG. 4 illustrates a concrete language representation of a portion of a computer program in one embodiment. A statement 410 is shown in a programming language such as C# that includes certain keywords defined by the language (e.g., "foreach") as well as certain variable names defined by the user (e.g., "bar"). Following the abstract-to-concrete transform, a concrete language representation 415 is produced. The concrete language representation shown in the figure contains elements of the C language for representing text and layout information after notational decisions have been resolved (such as, for example, whether fractions should appear horizontally separated by a slash or vertically with numerator on top of denominator separated by a horizontal line). The CFLineItem element 420 begins a line item that represents a logical line, but may be displayed as one or more lines depending on characteristics of the display area. The CFLineItem element 420 contains a list of text items 425 that begin the line. These text items 425 are followed by a CCSetTab element 430 that is a control in the C language which indicates that the following text should be indented by two spaces. The CCBreakIfAnyBreaks elements 435, 445, and 455 indicate points within the display that would be appropriate for placing a line break if necessary due to the dimensions of the display area. Text items 440, 450, and 465 represent the text elements of the logical line. The CCSetTab element 460 discontinues the tabification of line items set by the earlier CCSetTab element 430. Finally, the end parenthesis 470 represents the end of the CFLineItem element 420.

Figure 5:
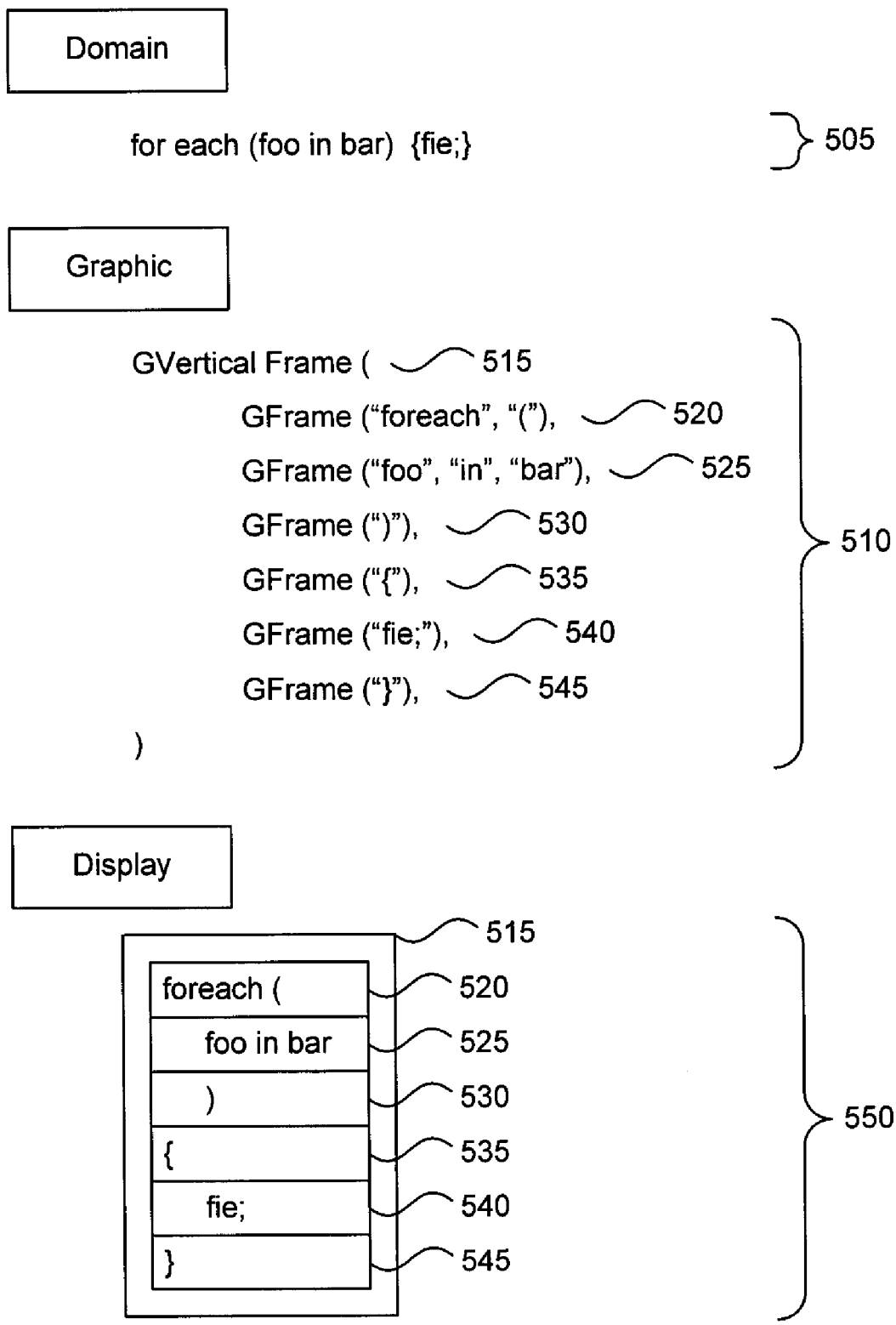
FIG. 5 illustrates a graphical language representation of a portion of a computer program in one embodiment.

FIG. 5 illustrates a graphical language representation of a portion of a computer program in one embodiment. A statement 505 is shown in a programming language such as C# that includes certain keywords defined by the language (e.g., "foreach") as well as certain variable names defined by the user (e.g., "bar"). Following the concrete-to-graphical transform, a graphical language representation 510 is produced. The graphical language representation shown in the figure contains elements of the G language for describing the layout of the domain language document on a display device, such as a computer monitor. The concrete-to-graphical transform receives input about the dimensions of the display area, such as the size of a window in which the information is to be rendered. The GVerticalFrame element 515 organizes the frames within it in a vertical layout such that each will be displayed on top of the other. The first GFrame element 520 represents the "foreach" keyword of the domain language and the beginning parenthesis for the foreach keyword. The next GFrame element 525 represents a line that contains marks for rendering the text "foo in bar." The next GFrame element 530 represents a line containing the end parenthesis of the foreach keyword. The next GFrame element 535 represents the beginning curly brace for the body of the foreach keyword. The next GFrame element 540 represents the single line of text within the body of the foreach keyword, "fie." The final GFrame element 545 represents the ending curly brace of the foreach keyword body. The example display 550 shows an example of the resulting layout of the frames on a display device. The boxes around the frames are shown for illustrative purposes and may or may not be displayed when the frames are actually rendered. Each GFrame element (520, 525, 530, 535, 540, and 545) is arranged vertically within the GVerticalFrame element 515.

Figure 6:
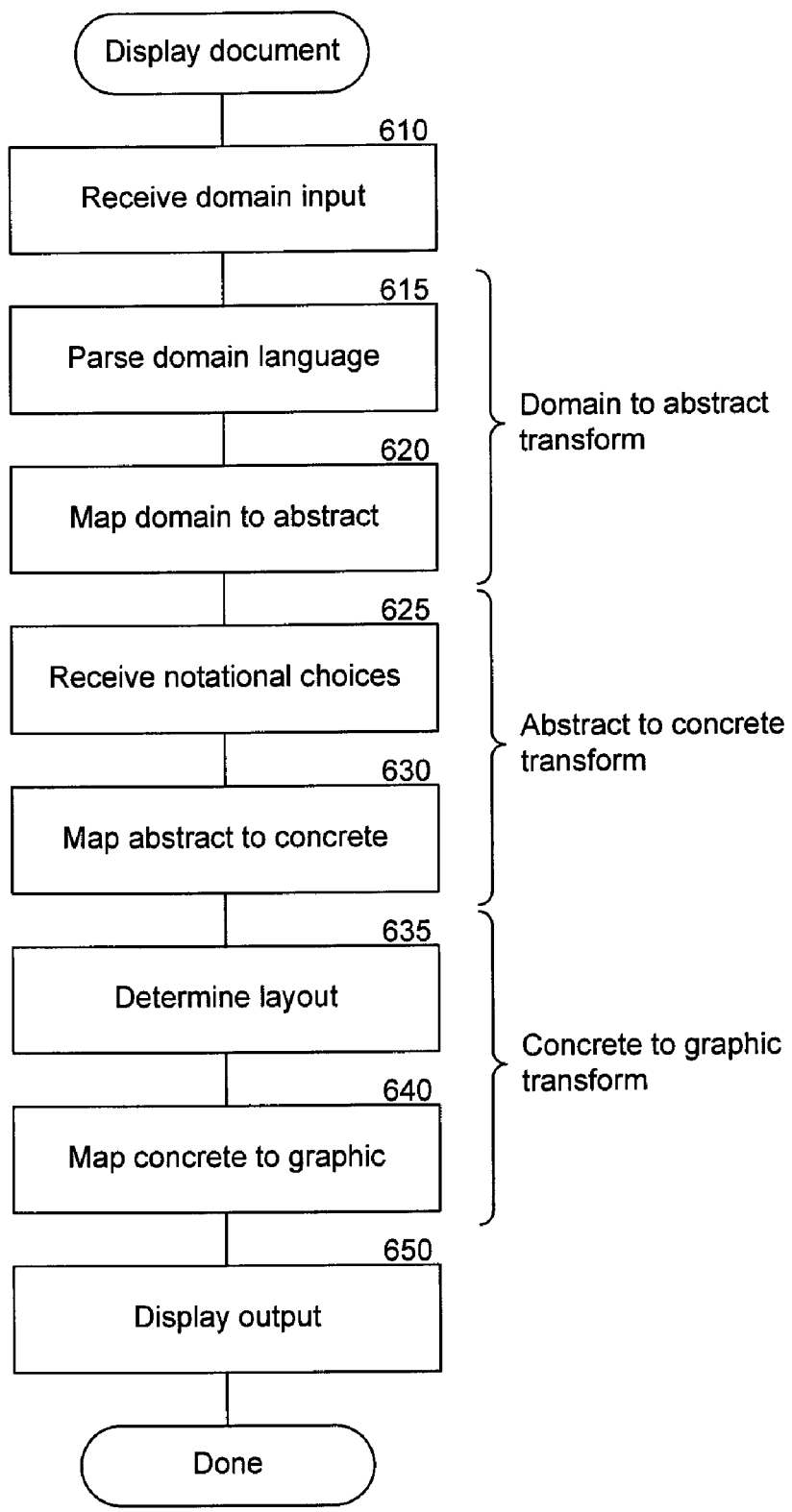
FIG. 6 is a flow diagram that illustrates the processing of the components of the transformation system in one embodiment.

FIG. 6 is a flow diagram that illustrates the processing of the components of the transformation system in one embodiment. The system is invoked to prepare a document in a domain-specific representation for display on a display device. In block 610, the system receives the domain-specific representation of the document. Blocks 615 and 620 represent the transformation from the domain language to the abstract language. In block 615, the system parses the domain language document. In block 620, the system maps elements of the domain language document to appropriate elements of the abstract language. Blocks 625 and 630 represent the transformation from the abstract language to the concrete language. In block 625, the system receives input regarding notational choices. In block 630, the system uses the notational choices to map abstract language elements to concrete language elements. Blocks 635 and 640 represent the transformation from the concrete language to the graphical language. In block 635, the system determines the layout of the display device to which the document is being rendered. In block 640, the system maps the concrete language elements to graphical language elements based on the dimensions and other constraints of the display area. In block 650, the system displays the graphical language document on the display device, and then completes.

From the foregoing, it will be appreciated that specific embodiments of the transformation system have been described herein for purposes of illustration, but that various modifications may be made without deviating from the spirit and scope of the invention. For example, although documents from the word processing and programming domains have been used for exemplary purposes, documents from numerous other domains can be handled by the transformation system. Although a document has been described as a single entity, the transformation system can handle many documents such as chapters of a book or the many source code files that are typical of a programming project. Accordingly, the invention is not limited except as by the appended claims.

We claim:

1. A system having a memory and a processor for representing a document specific to a domain for interaction with a user, comprising:

a domain-to-abstract language component configured to transform a domain language document in a domain language to an abstract language document in an abstract language at least in part by parsing the domain language document and mapping elements of the domain language document to abstract language elements of the abstract language, wherein the domain-to-abstract language component is specific to the domain of the domain language document and wherein the abstract language elements comprise:

data elements that represent data that does not contain semantics that need to be preserved for visual representation, statements that represent intentions of a document author, wherein the statements are capable of expressing documents having a variety of notations, operations that represent document elements that have combinational semantics defined priority, and first organizers that represent organizational information that affects the visual representation of the document, such that the abstract language represents the abstract language document in a fixed set of notational terms that are domain-independent and that represents multiple interchangeable, equivalent notations;

an abstract-to-concrete language component configured to transform the abstract language document in the abstract language to a concrete language document in a concrete language at least in part by mapping elements of the abstract language document to concrete language elements of the concrete language based on received notational choices, wherein the abstract-to-concrete language component is independent of the domain of the domain language document and wherein the concrete language elements comprise:

transparent frames that represent a box with one or more layout rules, controls that change a state of a display of the document through one or more layout rules, wherein the controls comprise a first control configured to set tabification rules for a block of text, control organizers that each defines a scope associated with a control, and first marks that represent data within the document, wherein each of a plurality of first marks have an associated formatting choice specified by the user, such that the concrete language represents the concrete language document after a specific set of marks have been chosen and describes a layout that can respond to interplay between sizes of elements and allotted display space;

a concrete-to-graphical language component configured to transform the concrete language document in the concrete language to a graphical language document in a graphical language at least in part by mapping elements of the concrete language document to graphical language elements of the graphical language based on dimensions of a display area, wherein the concrete-to-graphical language component is independent of the domain of the domain language document, wherein the graphical language elements comprise:

canvases that define an area of a display with specific dimensions, and second marks that represent a part of a displayed image relative to a canvas, each second mark having an associated reference position relative to a canvas, such that the graphical language describes a layout of elements of the graphical language document; and a display component configured to render the graphical language document wherein at least one of the components comprises computer-executable instructions stored in memory for execution by the system.

2. The system of claim 1 wherein the concrete-to-graphical component is further configured to perform a reverse transformation to transform a graphical language document to a concrete language document, wherein the abstract-to-concrete language component is further configured to perform a reverse transformation to transform a concrete language document to an abstract language document, and wherein the domain-to-abstract language component is further configured to perform a reverse transformation to transform an abstract language document to an domain language document.

3. The system of claim 1 wherein the domain document is source code for a computer program.

4. The system of claim 1 including a pending language component that represents intermediate changes to the document that are invalid for the domain and cannot be stored in the domain language.

5. The system of claim 1 wherein the concrete language represents formatting and styles applied to the document.

6. The system of claim 1 including a hit-testing component for detecting graphical language elements selected by a user based on a displayed representation of the document.

7. A computer-readable storage medium containing instructions for causing a computer system to represent a document specific to a domain for interaction with a user, comprising:

instructions of a domain-to-abstract language component for transforming a domain language document in a domain language to an abstract language document in an abstract language at least in part by parsing the domain language document and mapping elements of the domain language document to abstract language elements of the abstract language, wherein the domain-to-abstract language component is specific to the domain of the domain language document and wherein the abstract language elements comprise:

data elements that represent data that does not contain semantics that need to be preserved for visual representation, statements that represent intentions of a document author, wherein the statements are capable of expressing documents having a variety of notations, operations that represent document elements that have combinational semantics defined priority, and first organizers that represent organizational information that affects the visual representation of the document, such that the abstract language represents the abstract language document in a fixed set of notational terms that are domain-independent and that represents multiple interchangeable, equivalent notations;

instructions of an abstract-to-concrete language component for transforming the abstract language document in the abstract language to a concrete language document in a concrete language at least in part by mapping elements of the abstract language document to concrete language elements of the concrete language based on received notational choices, wherein the abstract-to-concrete language component is independent of the domain of the domain language document and wherein the concrete language elements comprise:
  transparent frames that represent a box with one or more layout rules,
  controls that change a state of a display of the document through one or more layout rules, wherein the controls comprise a first control configured to set tabification rules for a block of text,
  control organizers that each defines a scope associated with a control, and
  first marks that represent data within the document, wherein each of a plurality of first marks have an associated formatting choice specified by the user,
  such that the concrete language represents the concrete language document after a specific set of marks have been chosen and describes a layout that can respond to interplay between sizes of elements and allotted display space;
instructions of a concrete-to-graphical language component for transforming the concrete language document in the concrete language to a graphical language document in a graphical language at least in part by mapping elements of the concrete language document to graphical language elements of the graphical language based on dimensions of a display area, wherein the concrete-to-graphical language component is independent of the domain of the domain language document, wherein the graphical language elements comprise:
  canvases that define an area of a display with specific dimensions, and
  second marks that represent a part of a displayed image relative to a canvas, each second mark having an associated reference position relative to a canvas,
  such that the graphical language describes a layout of elements of the graphical language document; and
instructions of a display component for rendering the graphical language document.

8. The computer-readable storage medium of claim 7 wherein the concrete-to-graphical component is further for performing a reverse transformation to transform a graphical language document to a concrete language document, wherein the abstract-to-concrete language component is further for performing a reverse transformation to transform a concrete language document to an abstract language document, and wherein the domain-to-abstract language component is further for performing a reverse transformation to transform an abstract language document to an domain language document.

9. The computer-readable storage medium of claim 7 wherein the domain document is source code for a computer program.

10. The computer-readable storage medium of claim 7 including instructions for a pending language component that represents intermediate changes to the document that are invalid for the domain and cannot be stored in the domain language.

11. The computer-readable storage medium of claim 7 wherein the concrete language represents formatting and styles applied to the document.

12. The computer-readable storage medium of claim 7 including a hit-testing component for detecting graphical language elements selected by a user based on a displayed representation of the document.

* * * * *

UNITED STATES PATENT AND TRADEMARK OFFICE
CERTIFICATE OF CORRECTION

PATENT NO.      : 7,949,949 B2           Page 1 of 1
APPLICATION NO. : 11/561753
DATED           : May 24, 2011
INVENTOR(S)     : Charles Simonyi et al.

It is certified that error appears in the above-identified patent and that said Letters Patent is hereby corrected as shown below:

On the Title page, Item (56)
On Page 2, line 36, under "Other Publications", delete "vvww-306.ibm.com" and insert
-- www-306.ibm.com --, therefor.

Signed and Sealed this
Ninth Day of August, 2011

David J. Kappos
*Director of the United States Patent and Trademark Office*